(12) United States Patent
Guanzon et al.

(10) Patent No.: US 6,508,499 B1
(45) Date of Patent: Jan. 21, 2003

(54) REAR CARGO LINING STORAGE AREA

(75) Inventors: Ruben Guanzon, Powell, OH (US); Toshikazu Hirose, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/035,946

(22) Filed: Dec. 26, 2001

(51) Int. Cl.[7] .................. B60R 11/06; B60R 5/04; B62D 33/04
(52) U.S. Cl. .................. 296/37.1; 296/37.14; 296/37.16
(58) Field of Search .................. 296/24.1, 37.1, 296/37.2, 37.8, 37.14, 37.16

(56) References Cited

U.S. PATENT DOCUMENTS

| | | | | |
|---|---|---|---|---|
| 3,291,520 A | * | 12/1966 | Smith | 296/37.16 |
| 4,776,625 A | * | 10/1988 | Lobanoff et al. | 296/37.16 |
| 5,011,208 A | | 4/1991 | Lewallen | |
| 5,067,546 A | | 11/1991 | Jeuffray et al. | |
| 5,441,183 A | * | 8/1995 | Frenzel | 296/37.1 |
| 5,562,321 A | * | 10/1996 | VanHoose | 296/37.16 |
| 5,584,523 A | | 12/1996 | Kawaguchi | |
| 5,685,592 A | * | 11/1997 | Heinz | 296/37.16 |
| 5,799,845 A | * | 9/1998 | Matsushita | 296/37.2 |
| 5,947,358 A | * | 9/1999 | Wieczorek | 296/37.16 |
| 5,970,884 A | * | 10/1999 | Taille et al. | 296/37.16 |
| 6,027,155 A | * | 2/2000 | Wisniewski et al. | 296/37.1 |
| 6,155,625 A | * | 12/2000 | Felix | 296/37.14 |
| 2002/0070574 A1 | * | 6/2002 | Carlsson et al. | 296/37.14 |

* cited by examiner

*Primary Examiner*—D. Glenn Dayoan
*Assistant Examiner*—H. Gutman
(74) *Attorney, Agent, or Firm*—Rankin, Hill, Porter & Clark LLP

(57) ABSTRACT

A cargo bin liner is adapted to retain and store a tonneau cover therein. The cargo bin liner includes a central cup-shaped member and a pair of wings that extend outwardly from opposite ends of the cup-shaped wall. The wings include a base wall, forward wall, a rearward wall, and an end wall. The forward and rearward walls are spaced apart a distance that closely corresponds to a width dimension of the tonneau cover received therebetween such that the tonneau cover is snugly fitted against unintended horizontal movement. The end wall includes mounting members that engage terminal ends of the tonneau cover and prevent unintended vertical and horizontal movement of the tonneau cover. The cargo bin liner has a cargo bin lid pivotally secured thereto, and provides engagement surfaces to vertically support the lid when the lid is in a closed position.

17 Claims, 5 Drawing Sheets

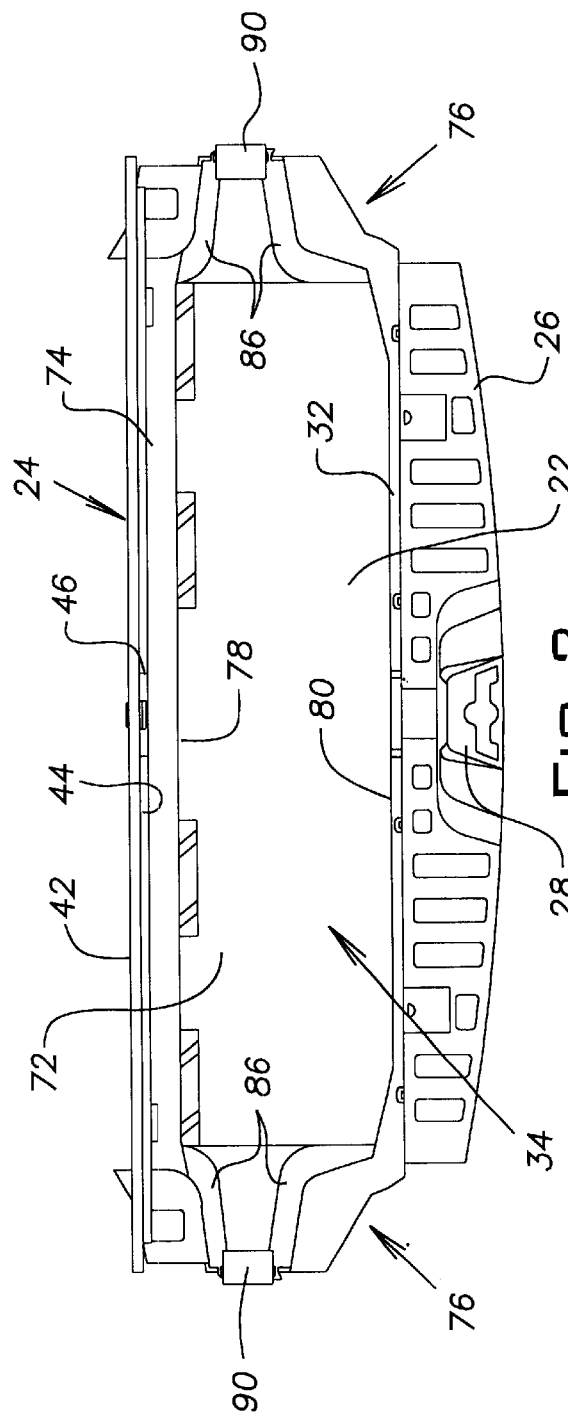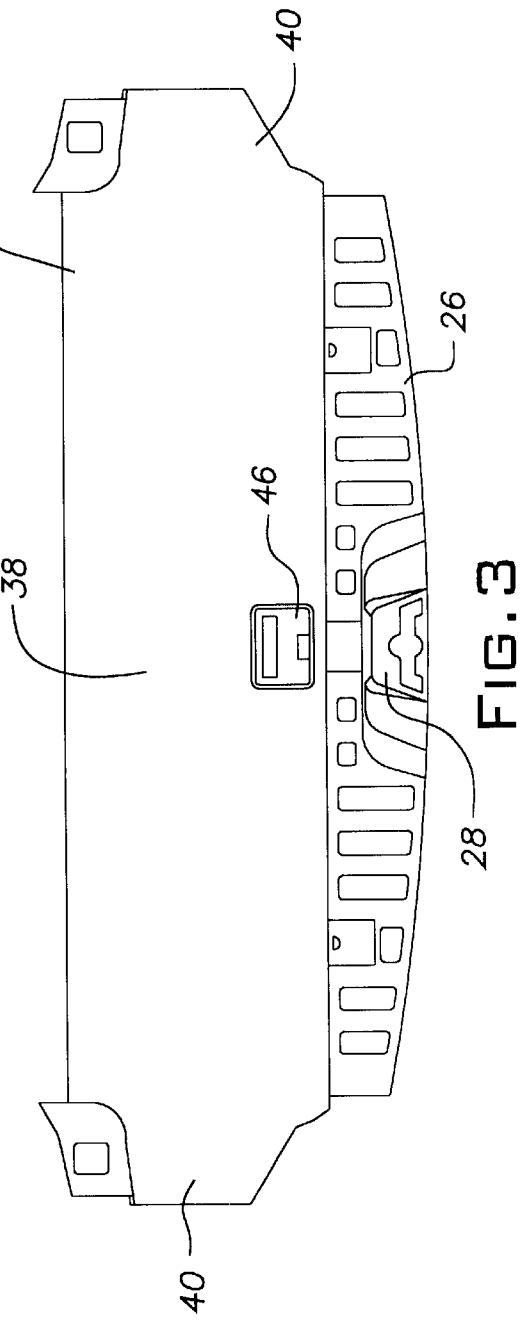

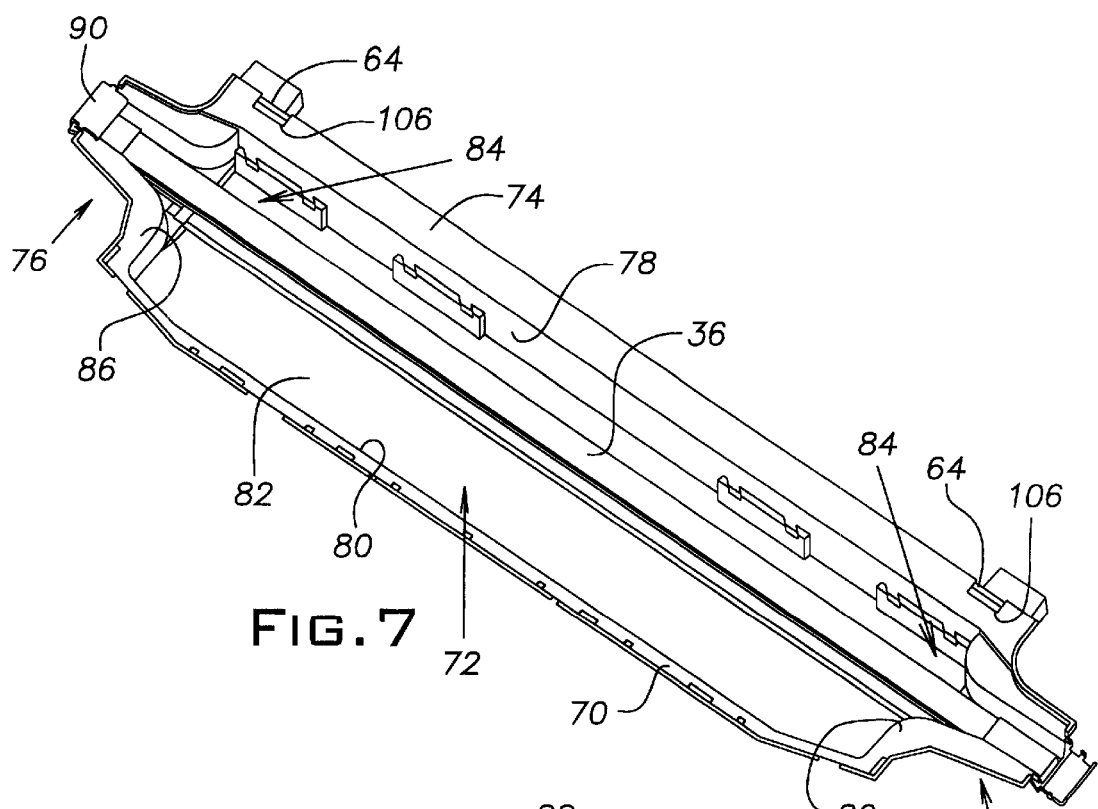
FIG. 7
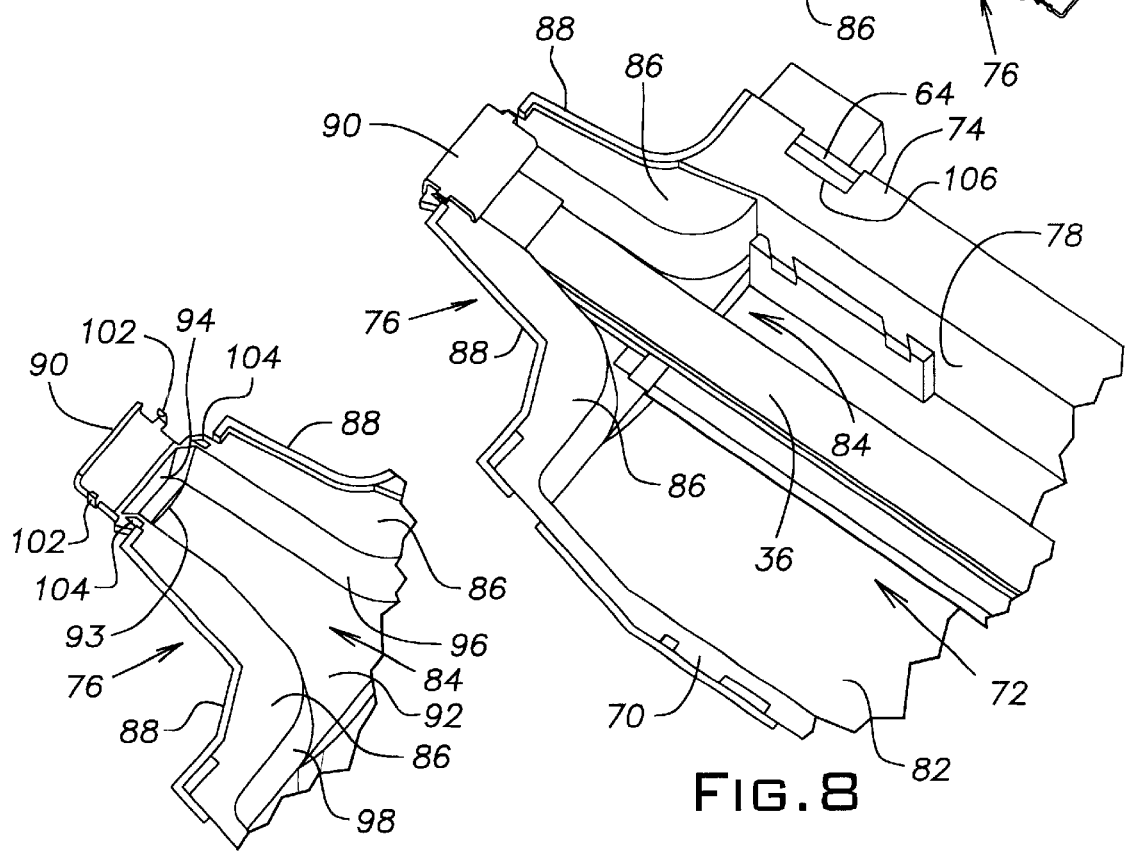
FIG. 9
FIG. 8

REAR CARGO LINING STORAGE AREA

BACKGROUND OF THE INVENTION

1. Field of the Invention

The present invention is generally directed toward cargo linings for automobiles and, more particularly, toward cargo linings that are adapted to store a tonneau cover.

2. Description of Related Art

Tonneau covers have developed over the years in an attempt to give the automobile owner more privacy and security for items stored in the rear of the vehicle. Typically, the tonneau cover includes a housing containing a spool on which a flexible cover is wound. The flexible cover is withdrawn from the housing when the cover is used. Conventionally, the tonneau cover housing is secured to interior sidewalls of a vehicle at one end of a space to be concealed by the cover, and the cover is withdrawn from the housing, over the vehicle space, and then secured to the vehicle interior sidewalls at a second end of the space to be concealed. Such a known arrangement is illustrated generally in U.S. Pat. No. 5,584,523, the disclosure of which is incorporated herein by reference.

Although the known tonneau covers work satisfactorily, there exists a problem that the cover is only used occasionally, and there is no place in the automobile to store the tonneau cover. Therefore, the user is forced to either place the cover on the floor of the vehicle or to store the cover remote from the vehicle. If the cover is stored on the vehicle floor, it may be damaged or may be an obstruction to passengers moving in the vehicle. If the tonneau cover is stored remote from the vehicle, for instance in a garage, it is not available to the user.

Therefore, there exists a need in the art for a designated area in the vehicle for storage of the tonneau cover. There further exists a need in the art for such a designated storage area that is conveniently accessed by the user and specially adapted to retain the cover securely to prevent damage thereto during operation of the vehicle.

SUMMARY OF THE INVENTION

The present invention is directed toward providing a designated area in the vehicle for storage of the tonneau cover. The present invention is further directed toward a designated storage area that is conveniently accessed by the user and specially adapted to retain the cover securely to prevent damage thereto during operation of the vehicle.

In accordance with the present invention, a cargo bin liner is specially adapted to receive a tonneau cover for storage. The cargo bin liner includes a cup-shaped wall and a pair of wings that extend outwardly from opposite ends of the cup-shaped wall. The cup-shaped wall defines a central storage area provided by the cargo bin liner. The pair of wings includes a structure to retain the tonneau cover against unintended movement.

In further accordance with the present invention, a cargo bin lid is pivotally secured to the cargo bin liner and is movable between an open position and a closed position. The cargo bin liner provides engagement surfaces that vertically support the cargo bin lid when the lid is in the closed position.

BRIEF DESCRIPTION OF THE DRAWINGS

These and further features of the invention will be apparent with reference to the following description and drawings, wherein:

FIG. 2 is a top plan view showing a cargo bin liner, cargo bin lid, and panel, with the cargo bin lid in the open position;

FIG. 3 is a top plan view similar to FIG. 2, but showing the cargo bin lid in the closed position;

FIG. 7 is a perspective view of the cargo bin liner with a tonneau cover received therein;

FIG. 8 is an enlarged perspective view of an outwardly extending wing of the cargo liner with the tonneau cover received therein; and, FIG. 9 is an enlarged perspective view of the outwardly extending wing of the cargo bin liner, with the tonneau cover removed.

DETAILED DESCRIPTION OF THE PREFERRED EMBODIMENTS

Figure 1:
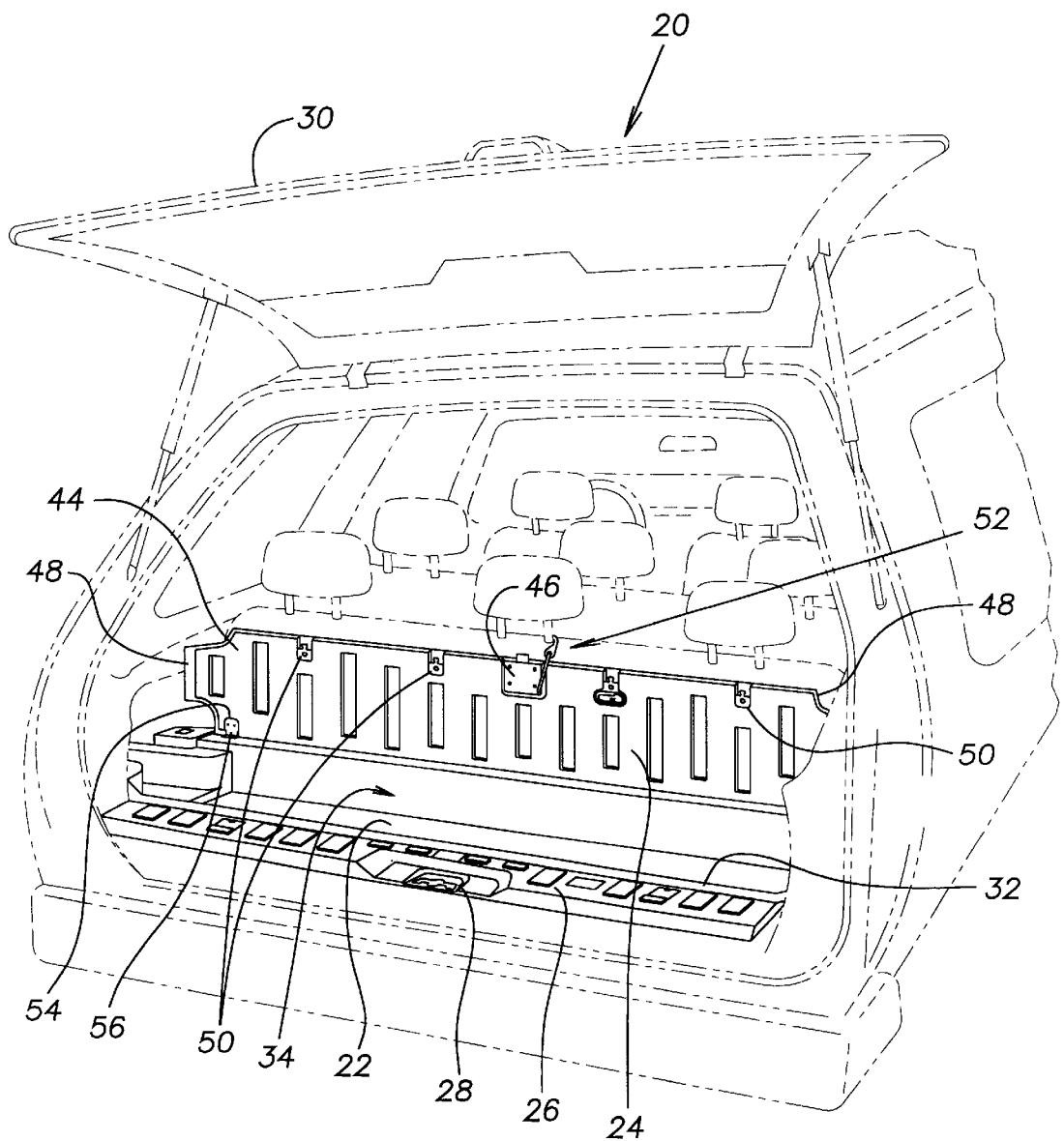
FIG. 1 schematically illustrates a vehicle incorporating the present invention.

With reference to FIG. 1, a rear end of a vehicle 20 incorporating a cargo bin liner 22 and cargo bin lid 24 according to the present invention is schematically illustrated. The vehicle 20 includes a generally horizontal panel 26 that incorporates a latch assembly 28 for the rear hatch 30. The panel 26 includes a forward-facing portion 32 that is recessed relative to the remainder of the panel 26. The cargo bin liner 22 is disposed relatively in front of the panel 26, and defines a receptacle 34 for a tonneau cover 36 (FIG. 7), to be described hereinafter.

The cargo bin lid 24, which is movable between a closed position covering the receptacle 34 provided by the cargo bin liner 22 and an open position permitting access to cargo bin liner 22, is shown in the open position in FIGS. 1–2 and in the closed position in FIG. 3. The cargo bin lid 24, which has a central body member 38 from which laterally project a pair of extensions 40, has an upper surface 42 and a lower surface 44. The upper surface 42 is generally planar and has a sliding latch assembly 46 disposed toward an upper edge (rearward) thereof by means of which the lid 24 may be releasably secured to a catch (not shown) provided on the panel 26 when the lid 24 is in the closed position. The lower surface 44 of the cargo bin lid 24 has a pattern of relatively recessed portions therein to stiffen the lid 24 against deformation.

The cargo bin lid lower surface 44 also provides a peripheral recessed portion 48, which is provided to assist in positioning the cargo bin lid 24 on the cargo bin liner 22 and panel 26, as will be discussed more fully hereinafter. Several hooks 50 are provided along the upper (rearward) edge of the cargo bin lid lower surface 44 on which items, such as grocery bags, backpacks, etc., may be hung. The upper (rearward) edge also includes a tether assembly 52 that is operable to secure the cargo bin lid 24 in the open position during operating of the vehicle 20. A pair of hinge-receiving recesses 54 are provided adjacent a lower (forward) edge and lateral sides of the cargo bin lid lower surface 44. The hinge-receiving recesses 54 are essentially extensions of the peripheral recess 48.

Figure 4:
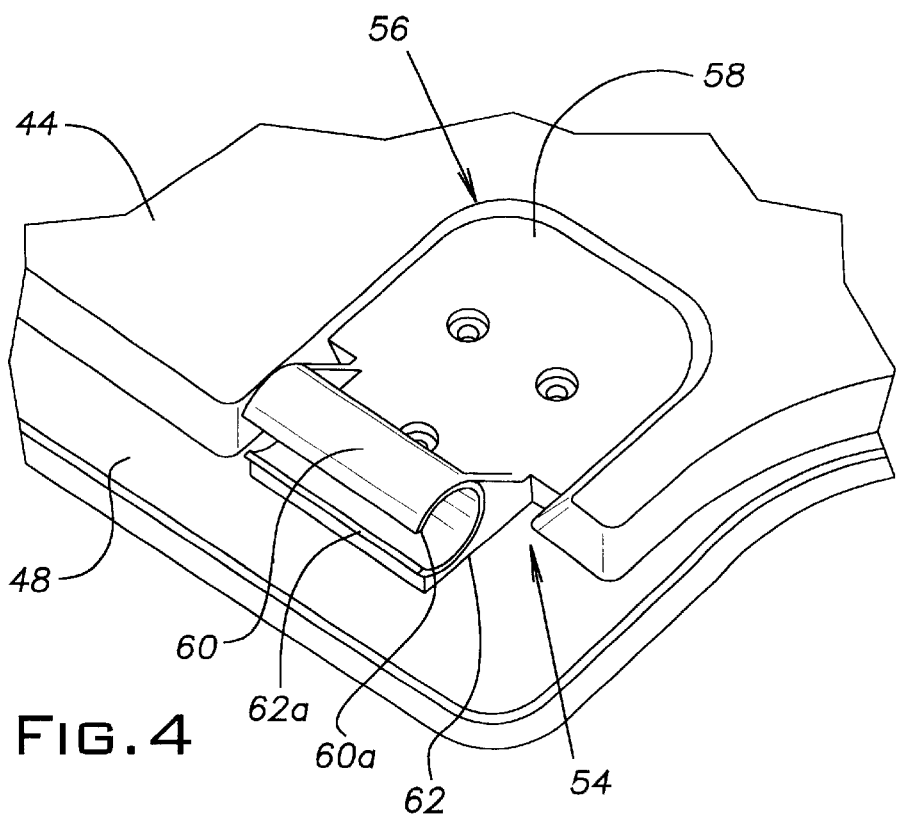
FIG. 4 is an enlarged perspective view of a portion of a hinge disposed on the cargo bin lid.
Figure 5:
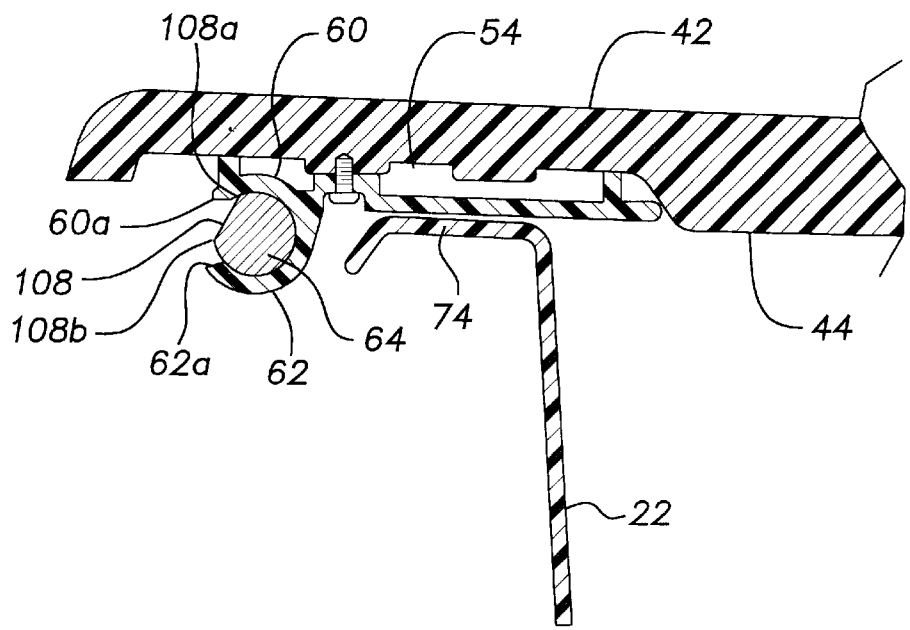
FIG. 5 is a cross sectional view of the cargo bin lid and cargo bin liner showing the hinge of the lid secured to a hinge pin of the liner.
Figure 6:
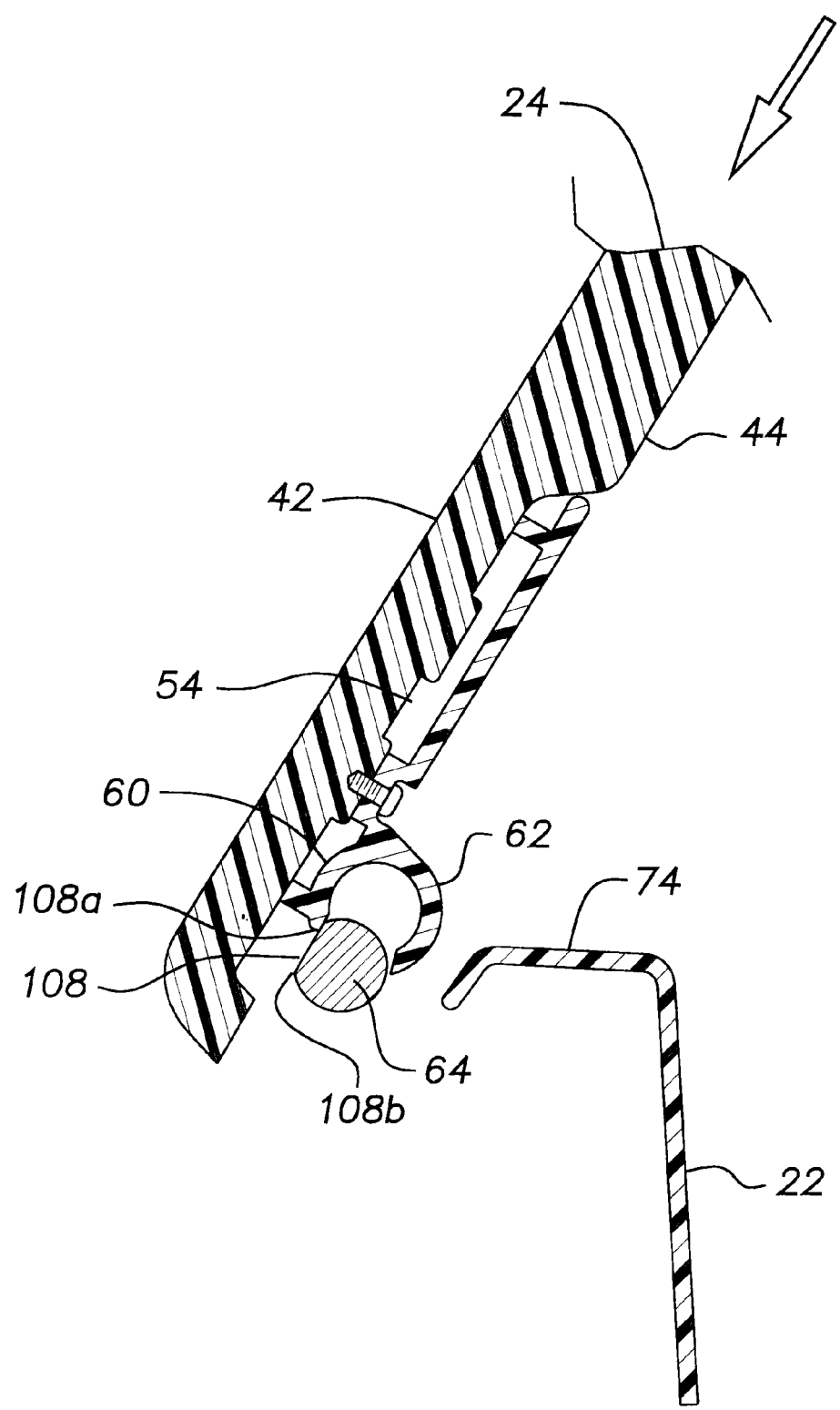
FIG. 6 is similar to FIG. 5, but shows the lid in an angled orientation prior to snap-fitting assembly of the hinge over the hinge pin.

With reference to FIGS. 4–6, a hinge 56 is received within an associated hinge-receiving recess 54 in the cargo bin lid lower surface 44. Each of the hinges 56 has a body member 58 disposed in the hinge-receiving recess 54 and from which first and second hinge arms 60, 62 extend. When installed in the hinge-receiving recess, the outer surface of the body member 58 is substantially flush with a surrounding surface of the cargo bin lower surface 44, as illustrated.

The first hinge arm 60 is essentially an extension of the body member 58 and is disposed against the cargo bin lid lower surface 44. The second hinge arm 62, which traverses a curve or arc, extends away from the body member 58 and relatively beyond (below) the cargo bin lid lower surface 44, as illustrated. The first and second hinge arms 60, 62 cooperate to define an elongated receptacle, which is somewhat C-shaped in cross section, that snap-fittingly receives a hinge pin or striker 64 provided by the cargo bin liner 22 and described further hereinafter. The arc defined by the combination of the first and second hinge arms 60, 62 may be increased or decreased from that shown in the drawings so as to provide a desired retention force. The distal end of the first hinge arm 60 preferably includes a rib or enlargement 60a that faces the second hinge arm 62 while the distal end of the second hinge arm 62 includes a rib or enlargement 62a that faces the first hinge arm 60. The hinge arm ribs 60a, 62a help to stiffen the distal end of the hinge arms 60, 62 and thereby more securely retain the hinge pin 64 therebetween.

The cargo bin liner 22 is preferably formed from plastic and is integrally molded to form a unitary or one-piece structure. With reference to FIGS. 2, 3, and 7–9, the cargo bin liner 22 is shown to include a rearward-facing flange 70, a central well portion 72, a raised platform 74, and a pair of outwardly extending wings 76. As will be appreciated from the drawings, when the lid 24 is closed, the central body portion 38 of the lid 24 overlies the central well portion 72 of the cargo bin liner 22 and the pair of extensions 40 overlies the outwardly extending wings 76.

The rearward-facing flange 70 is retained relatively beneath the forward-facing recessed portion 32 of the panel 26 by means of conventional fastening techniques. The central well portion 72 is a generally cup-shaped member that defines a central storage area of the cargo bin liner 22. The central well portion 72 includes a forward vertical wall 78, a horizontal base wall 82, and a rearward vertical wall 80. The rearward vertical wall 80 extends downwardly from the rearward-facing flange 70 and the forward vertical wall 78 is integrally connected to the raised platform 74, as illustrated. The base wall 82 interconnects the forward and rearward vertical walls 78, 80.

Each of the outwardly extending wings 76, which are adapted to receive an end of the tonneau cover 36 and to vertically support the closed cargo bin lid 24, includes a bowl-shaped wall 84, a pair of spaced apart engagement surfaces 86, a peripheral rim 88, and a cap member 90. The bowl-shaped wall 84 is stepped relatively above the base wall 82 of the central well portion 72, and includes a bottom wall 92, an end wall 94, a forward wall 96, and a rearward wall 98. The bottom wall 92 includes a raised ledge or support surface 93 adjacent the end wall 94 upon which an end of the tonneau cover 36 is placed and vertically supported. The forward and rearward walls 96, 98, which are vertically oriented and interconnect the bottom wall 92 with the engagement surfaces 86, are spaced from one another a distance that closely matches a width dimension of the tonneau cover 36 so as to-snugly receive the tonneau cover 36 therebetween. The cap members 90 laterally extend from an upper end of the end walls 94, and include a pair of mounting tabs 102. The mounting tabs 102 are adapted to fit within accommodating openings 104 that are formed in the upper end of the end walls 94. When the mounting tabs 102 are snapped through the openings 104, the cap members 90 overlie the end wall 94 and cooperate with outer ends of the forward and rearward walls 96, 98 to define a pocket that is adapted to receive the end of the tonneau cover 36.

The end wall 94 serves as a mounting surface against which the end of the tonneau cover is frictionally secured to positively secure the tonneau cover 36 against movement during operation of the vehicle 20. In this regard it is important to realize that tonneau covers 36 are conventionally axially spring-loaded to facilitate secure mounting during use in the passenger compartment. Therefore, for storage in the cargo bin liner 22 of the present invention, the tonneau cover 36 is collapsed in a lengthwise direction, inserted into the desired storage position, and then allowed to expand into an interference fit with the end walls 94 of the cargo bin outwardly extending wings 76.

The raised platform 74 is generally planar and includes a pair of openings 106 that are each traversed by the associated hinge pin 64. Each of the hinge pins has a flat surface 108 formed therein so as to be generally D-shaped in cross section. As shown best in FIGS. 5–6, the flat surface 108 is generally at an angle to the plane of the raised platform 74, the angle being between about 30–60°, and preferably about 45°. The flat surface 108 includes an upper or leading edge 108a and a lower or trailing edge 108b. The angular orientation of the hinge pin flat surface 108 facilitates snap-fitting securement of the cargo bin lid hinges 56 to the hinge pins 64. More specifically, for snap-fitting assembly of the cargo bin lid 24 to the cargo bin liner 22, the cargo bin lid 24 is oriented at an angle to the raised platform 74 and the hinge arms 60, 62 are positioned such that the first hinge arms 60 are in engagement with the upper or leading edge 108a of the hinge pints flat portions 108 while the second hinge arms 62 are in engagement with the radially opposite side of the hinge pins 64 (FIG. 6). Thereafter, the cargo bin lid 24 is pushed or forced toward the hinge pins 64 generally parallel to the plane of the flat portions 108 so as to resiliently spread the first and second hinge arms 60, 62 away from each other and thereby insert the hinge pins 64 between the hinge arms 60, 62. The, hinge arms 60, 62 snap around the hinge pin 64 (the first hinge arm 60 snapping slightly over the trailing edge 108b of the flat surface 108) so as to essentially return to their original configuration and retain the hinge pin 64 therebetween, while permitting the cargo bin lid 24 to rotate about the hinge pins 64 to move the cargo bin lid 24 between the open and closed positions.

When in the closed position, the lower surface 44 of the cargo bin lid 24 is supported about its periphery by the cargo bin liner 22 and the panel 26. More specifically, the lower surface 44 of the cargo bin lid 24 rests upon the raised platform 74 of the cargo bin liner 22, while the recessed peripheral portion 48 of the cargo bin lid 24 rests upon the engagement surfaces 86 of the outwardly extending wings 76 and the forward-facing recessed portion 32 of the panel 26. The peripheral rim 88 preferably surrounds at least a portion of the cargo bin lid 24 and further serves to properly align the lid 24 in the closed position.

Although the preferred embodiments of the present invention have been described with particularity herein, it is considered apparent that the present invention is capable of numerous modifications and rearrangements of parts and will typically be customized to fit the host vehicle. Accordingly, the present invention is not to be limited to the structure specifically described herein, but rather is only defined by the claims appended hereto.

What is claimed is:

1. A cargo bin liner adapted to receive a tonneau cover for storage, said cargo bin liner comprising:
   a central well defining a storage area provided by said cargo bin liner; and,
   a pair of outwardly extending wings that project laterally from opposite ends of said central well, said outwardly extending wings comprising a bottom wall, forward wall, a rearward wall, and an end wall, said forward and rearward walls being spaced apart a distance that closely corresponds to a width dimension of said tonneau cover such that the tonneau cover is snugly received between said forward and rearward walls.

2. The cargo bin liner according to claim 1, wherein said end wall comprises a mounting member that is operable to secure a terminal end of said tonneau cover against movement in at least one direction.

3. The cargo bin liner according to claim 1, wherein said end wall has a cap member secured thereto, said cap member overlying a terminal portion of said tonneau cover.

4. The cargo bin liner according to claim 3, wherein said cap member is integrally formed with said end wall.

5. The cargo bin liner according to claim 4, wherein said bottom wall further comprises a ledge, said ledge being adjacent said end wall and receiving the terminal portion of the tonneau cover.

6. A cargo bin liner adapted to receive a tonneau cover for storage, said cargo bin liner comprising:
   a cup-shaped wall defining a central storage area provided by said cargo bin liner; and,
   a pair of outwardly extending wings that project laterally from opposite ends of said cup-shaped wall, said outwardly extending wings comprising a bowl-shaped wall and an end wall, said end wall comprising mounting members that are adapted to receive a terminal end of the tonneau cover and to hold said tonneau cover against unintended vertical and horizontal movement.

7. The cargo bin liner according to claim 6, wherein said mounting members comprise first and second mounting members, said first mounting member being operable to prevent the unintended horizontal movement of said tonneau cover and said second mounting member being operable to prevent unintended vertical movement of said tonneau cover.

8. The cargo bin liner according to claim 7, wherein said first mounting member comprises a cap member and a ledge, said cap member being secured over said end wall and overlying the terminal end of the tonneau cover while said ledge is provided by said bowl shaped wall adjacent said end wall and being adapted to vertically support said tonneau cover.

9. The cargo bin liner according to claim 8, wherein said second mounting member includes a pair of vertical walls that are spaced apart a distance that generally conforms with a width dimension of said tonneau cover.

10. A cargo bin assembly comprising a cargo bin liner and a cargo bin lid, said cargo bin liner comprising a cup-shaped wall, a pair of wings that project laterally from said cup-shaped wall, and a raised platform that include hinge pins to which said cargo bin lid is secured, said cup-shaped wall defining a central storage area of said cargo bin liner, said pair of wings defining recesses that are adapted to receive relatively opposite ends of a tonneau cover and providing support surfaces that vertically support the cargo bin lid when said lid is in a closed position, said lid having a lower surface to which hinges are secured, said, hinges being pivotally mounted to said hinge pins to permit the cargo bin lid to be pivoted between the closed position in engagement with the support surfaces and an open position spaced from said support surfaces.

11. The cargo bin assembly according to claim 10, wherein said cargo bin liner includes a raised rim that surrounds at least a portion of said cargo bin lid when said lid is in the closed position.

12. The cargo bin assembly according to claim 11, wherein said cargo bin lid includes a recessed peripheral portion that rests against the support surface when said cargo bin lid is in the closed position.

13. The cargo bin assembly according to claim 12, wherein said laterally extending wings include a forward vertical wall and a rearward vertical wall that are spaced apart from one another such that said tonneau cover is snugly received therebetween.

14. The cargo bin assembly according to claim 12, wherein said laterally extending wings comprise an end wall, said end wall being adapted to frictionally engage a terminal end of said tonneau cover to help secure the tonneau cover within the cargo bin liner.

15. The cargo bin assembly according to claim 13, wherein said laterally extending wings further comprise an end wall, said end wall comprises a mounting member that is operable to secure a terminal end of said tonneau cover against movement in at least one direction.

16. The cargo bin assembly according to claim 15, wherein said end wall is adapted to frictionally engage said terminal end of said tonneau cover.

17. The cargo bin assembly according to claim 15, wherein said wings further comprise a ledge that is adapted to receive and vertically support said tonneau cover terminal end.

* * * * *

UNITED STATES PATENT AND TRADEMARK OFFICE
CERTIFICATE OF CORRECTION

PATENT NO.    : 6,508,499 B1                                    Page 1 of 1
DATED         : January 21, 2003
INVENTOR(S)   : Guanzon et al.

It is certified that error appears in the above-identified patent and that said Letters Patent is hereby corrected as shown below:

Column 3,
Line 63, delete "to-snugly" and insert -- to snugly --.

Column 4,
Line 34, delete "pints" and insert -- pin's --.

Column 5,
Line 44, after "prevent" insert -- the --.
Line 50, delete "bowl shaped" and insert -- bowl-shaped --.

Signed and Sealed this

Twenty-fourth Day of June, 2003

JAMES E. ROGAN
*Director of the United States Patent and Trademark Office*